United States Patent
Krig et al.

(10) Patent No.: US 9,378,534 B2
(45) Date of Patent: Jun. 28, 2016

(54) IMAGE STREAM PIPELINE CONTROLLER FOR DEPLOYING IMAGE PRIMITIVES TO A COMPUTATION FABRIC

(75) Inventors: Scott A. Krig, Folsom, CA (US); Stewart N. Taylor, Los Altos Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 245 days.

(21) Appl. No.: 13/994,013

(22) PCT Filed: Dec. 28, 2011

(86) PCT No.: PCT/US2011/067487
§ 371 (c)(1),
(2), (4) Date: Jun. 13, 2013

(87) PCT Pub. No.: WO2013/100934
PCT Pub. Date: Jul. 4, 2013

(65) Prior Publication Data
US 2013/0257883 A1 Oct. 3, 2013

(51) Int. Cl.
*G06T 1/20* (2006.01)
*G06T 7/00* (2006.01)
*G06T 15/00* (2011.01)
*G06K 9/48* (2006.01)

(52) U.S. Cl.
CPC .............. *G06T 1/20* (2013.01); *G06T 7/0083* (2013.01); *G06K 9/48* (2013.01); *G06T 15/005* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 5,606,657 A * | 2/1997 | Dennison | G06F 15/7832 345/501 |
| 5,802,361 A * | 9/1998 | Wang et al. | 382/217 |
| 6,762,763 B1 * | 7/2004 | Migdal et al. | 345/506 |
| 8,558,842 B1 * | 10/2013 | Johnson et al. | 345/581 |
| 8,704,836 B1 * | 4/2014 | Rhoades et al. | 345/502 |
| 2001/0045958 A1 | 11/2001 | Hochmuth et al. | |
| 2002/0033817 A1 | 3/2002 | Boyd et al. | |
| 2005/0195197 A1 * | 9/2005 | Wolfe | 345/505 |
| 2006/0242436 A1 * | 10/2006 | Peirson et al. | 713/300 |
| 2007/0071312 A1 | 3/2007 | Gardella et al. | |
| 2008/0266296 A1 * | 10/2008 | Ramey et al. | 345/440 |
| 2010/0239185 A1 | 9/2010 | Fowler et al. | |
| 2011/0153984 A1 * | 6/2011 | Wolfe et al. | 712/42 |

OTHER PUBLICATIONS

"Notification Concerning Transmittal of International Preliminary Report on Patentability Chapter 1 of the Patent Cooperation Treaty", Jul. 10, 2014, for International Application No. PCT/US2011/067487, 6pgs.

"PCT Notification of Transmittal of the International Search Report and the Written Opinion of the International Searching Authority, or the Declaration", dated Sep. 17, 2012, for International Application No. PCT/US2011/067487, 9pgs.

* cited by examiner

*Primary Examiner* — Ulka Chauhan
*Assistant Examiner* — Saptarshi Mazumder
(74) *Attorney, Agent, or Firm* — International IP Law Group, P.L.L.C.

(57) ABSTRACT

According to some embodiments, an image pipeline controller may determine an image stream having a plurality of image primitives to be executed. Each image primitive may be, for example, associated with an image algorithm and a set of primitive attributes. The image pipeline controller may then automatically deploy the set of image primitives to an image computation fabric based at least in part on primitive attributes.

28 Claims, 15 Drawing Sheets

US 9,378,534 B2

IMAGE STREAM PIPELINE CONTROLLER FOR DEPLOYING IMAGE PRIMITIVES TO A COMPUTATION FABRIC

BACKGROUND OF THE INVENTION

Many devices include one or more image sensors and/or image displays, and an image processing unit may facilitate the processing of data coming from the sensor, being provided to the display, and/or is otherwise being utilized by applications running on the device. For example, a smart phone might include a number of different cameras and a touch screen. The image processing unit may include an image computation fabric having a number of different components to process image information.

In some cases, the image processing unit may execute a series of image primitives to create output image data (e.g., to be sent to a touch screen) based on input image data (e.g., received from a smart phone's camera). The image primitives may be, for example, associated with an image primitive library and might include, for example, sensor primitives, calibration primitives, optics primitives, etc.

Typically, an application executing in connection the image processing unit determines which image primitives will be executed by the various components of the image computation fabric. For example, the application might determine that a filter primitive will be executed by fixed function hardware. Such an approach, however, can have several disadvantages. For example, the application might be unaware that another application is also attempting to use the same fixed function hardware. As a result, an application may "stall" or need to wait until the fixed function hardware becomes free, and the performance of the system may be degraded.

Moreover, the substantial number and relative complexity of image primitives (and the fact that they may operate differently in connection with different components of different image execution fabrics) may result in substantial software development costs and inhibit innovation for application software developers (who may be forced to create customized software for each new platform).

DETAILED DESCRIPTION OF EXAMPLE EMBODIMENTS

Figure 1:
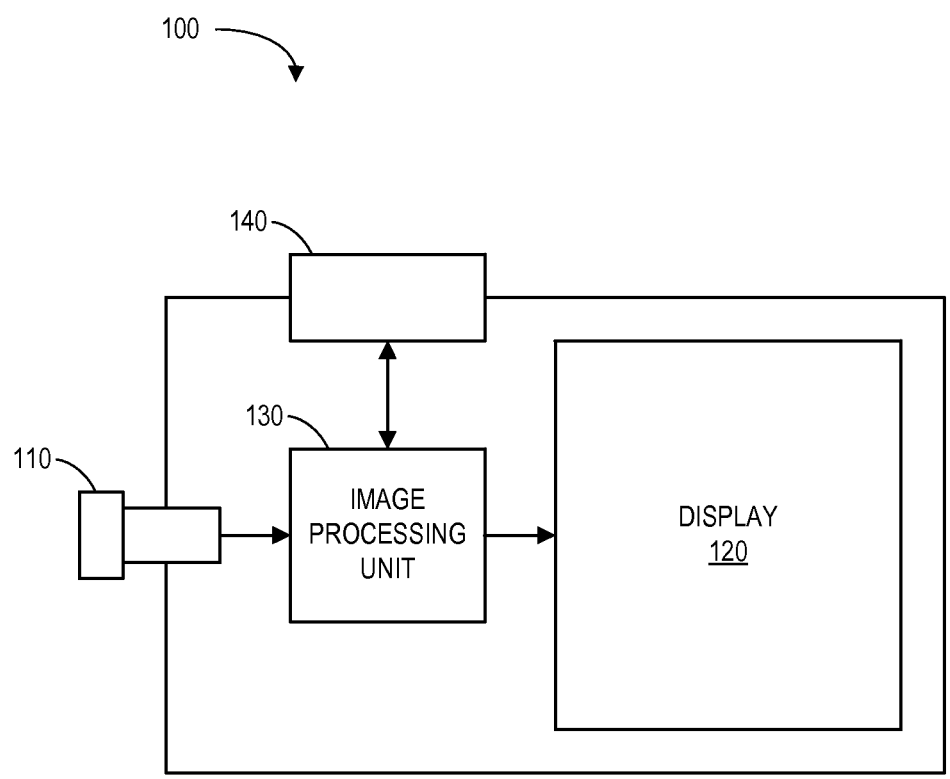
FIG. 1 is a block diagram of a device.

FIG. 1 is a block diagram of a device 100 that may include, for example, one or more image sensors 110 and/or image displays 120. The sensor 110 might comprise, for example, a camera, video camera, a depth sensor, and/or a stereo image sensor. The display 120 might comprise, for example, a touch screen, a high resolution display, and/or a three dimensional image. An image processing unit 130 may facilitate the processing of data coming from the sensor 110, being provided to the display 120, and/or is otherwise being utilized by applications running on the device 100. Note that the device 100 may further include one or more supplemental interfaces 140, such as a digital display port (e.g., to be coupled to a digital television or computer monitor), a wireless antenna, or a Universal Serial Bus (USB) interface. Note that the device might be associated with, for example, a smart phone, a tablet computer, a mobile computing device, a mobile telephone, a desktop computer, a laptop computer, a gaming system, a set-top box, or a television.

The device 100 illustrated in FIG. 1 may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

All systems and processes discussed herein may be embodied in program code stored on one or more non-transitory computer-readable media. Such media may include, for example, a solid state Random Access Memory ("RAM") or Read Only Memory ("ROM") storage units. Embodiments are therefore not limited to any specific combination of hardware and software.

Figure 2:
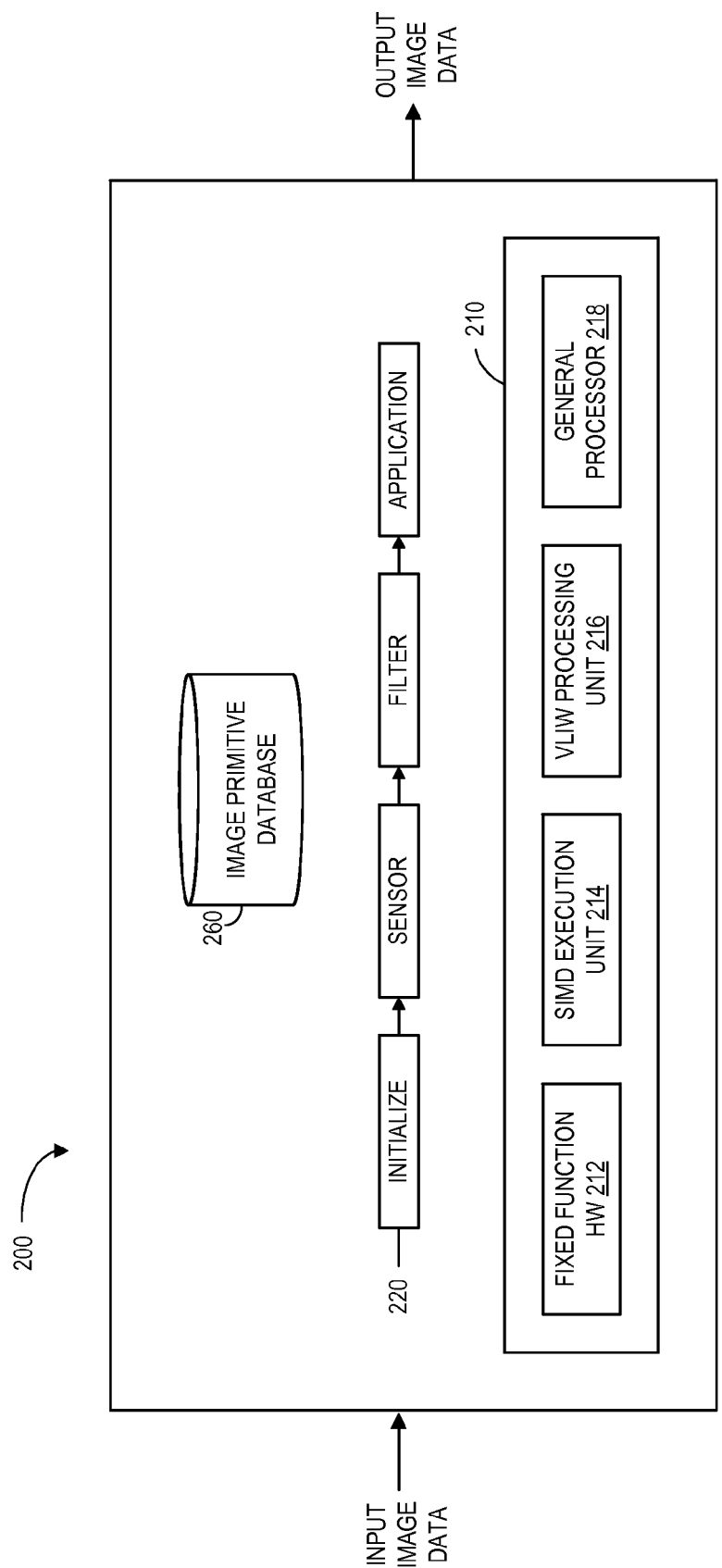
FIG. 2 is a block diagram of an imaging processing unit.

FIG. 2 is a block diagram of an imaging processing unit 200 that might be used in the display device of FIG. 1. The image processing unit 200 includes an image computation fabric 210 that may process image information. The image computation fabric 210 might include, for example, a fixed function hardware image processing unit 212, a Single Instruction, Multiple Data (SIMD) image execution unit 214, a Very Long Instruction Word (VLIW) processing unit 216, and/or a general processing unit 218.

The image processing unit 200 may execute a series of image primitives 220 to create output image data (e.g., to be sent to a touch screen) based on input image data (e.g., received from a smart phone's camera). The image primitives 220 are associated with an image primitive library stored in an image primitive database 260 and might include, for example, sensor primitives, calibration primitives, optics primitives, lighting primitives, depth primitives, segmentation primitives, color primitives, filter primitives, and/or three dimensional depth primitives.

The set of image primitives 200 executed on the stream of image information may represent a set of resources used by an application to process the image data. For example, an imaging application might require a small set of image primitives 200 to provide processing to implement specific high level algorithms, such as face recognition, gesture recognition, etc. That is, the image primitives 220 may be used together to process image data and achieve higher level goals. The image primitives 220 may represent building blocks for larger algorithms, and may be resources which must be managed and made available to multiple simultaneous imaging and visual computing applications.

A set of image primitives 220 may be associated with many different types of image algorithms, such as those associated with pixel correction, artifact removal, histogram information, scaling functions, face recognition, visual object recognition, visual scene analysis, machine vision, gesture recognition, and/or depth map calculations. Moreover, different types of image primitives 220 might be associated with, by way of examples only, camera sensor format processing (Bayer Red Green Blue (RGB), Aptina™ RGB, Kodak™ RGBW, etc.), camera sensor dimensions (1080p, etc.), camera sensor frame rates, calibrations (Auto White Balance, Auto Shutter, Auto Focus, etc.), dead pixel detection and correction, lighting controls, optics controls, three dimensional depth sensor controls (structured light, stereo triangulation, etc.), color conversion (RGB, YUV, HIV, etc.), Look-Up Table (LUT) processing and value substitution, boolean operations, segmenting an image into various component parts (foreground, background, objects, etc.), filters (sharpen, blur, media, etc.), edge detection (Sobel, Roberts, Prewitt, etc.), point operations (Pixel Math, etc.), and/or domain processing (Fourier, HAAR, Karhunen-Loeve, Slant Transform, etc.)

Typically, an application executing in connection the image processing unit 200 determines which image primitives 220 will be executed by the various components 212, 214, 216, 218 of the image computation fabric 210. For example, the application might determine that a filter primitive will be executed by the fixed function hardware 212. Such an approach, however, can have several disadvantages. For example, the application might be unaware that another application is also attempting to use the fixed function hardware 212. As a result, an application may "stall" or need to wait until the fixed function hardware becomes free, and the performance of the system may be degraded.

Moreover, the substantial number and relative complexity of image primitives 220 (and the fact that they may operate differently in connection with different components of different image execution fabrics 210) may result in substantial software development costs and inhibit innovation for application software developers (who may be forced to create customized software for each new platform).

Figure 3:
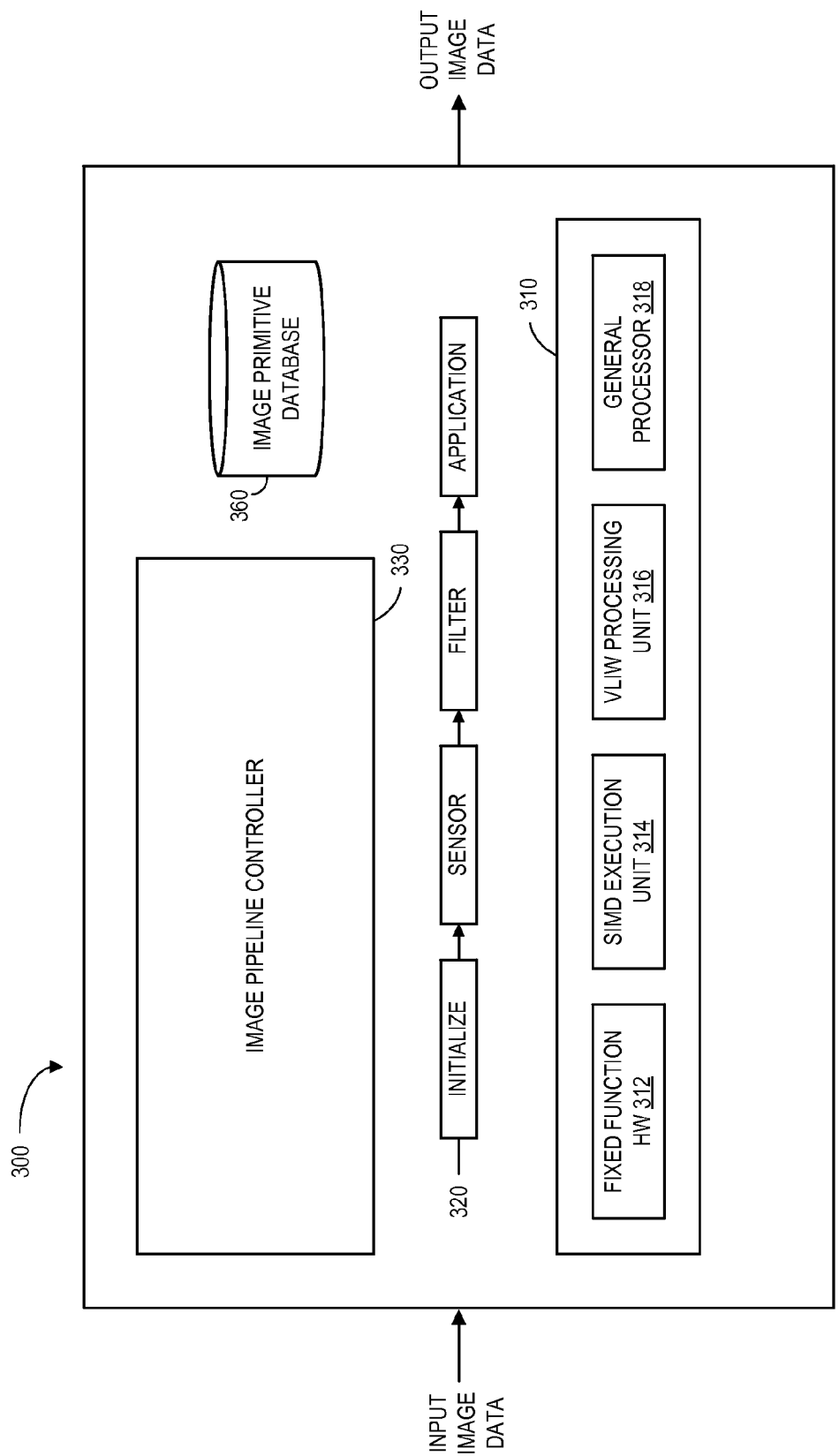
FIG. 3 is a block diagram of an imaging processing unit in accordance with some embodiments.

Thus, embodiments provided herein may provide for improved deployment of image primitives to a computation fabric. In particular, FIG. 3 is a block diagram of an imaging processing unit 300 in accordance with some embodiments. As before, the image processing unit 300 includes an image computation fabric 310 that may process image information. The image computation fabric 310 might include, for example, a fixed function hardware image processing unit 312, an SIMD image execution unit 314, a VLIW processing unit 316, and/or a general processing unit 318. The image processing unit 300 may execute a series of image primitives 320 to create output image data (e.g., to be sent to a touch screen) based on input image data (e.g., received from a smart phone's camera). The image primitives 320 are associated with an image primitive library stored in an image primitive database 360. According to this embodiment, an image pipeline controller 330 may be used to help deploy the image primitives 320 to the image computation fabric 310. Note that the image pipeline controller 330 might be associated with a hardware image pipeline controller, a software image pipeline controller, or a combination of hardware and software image pipeline controller components.

Figure 4:
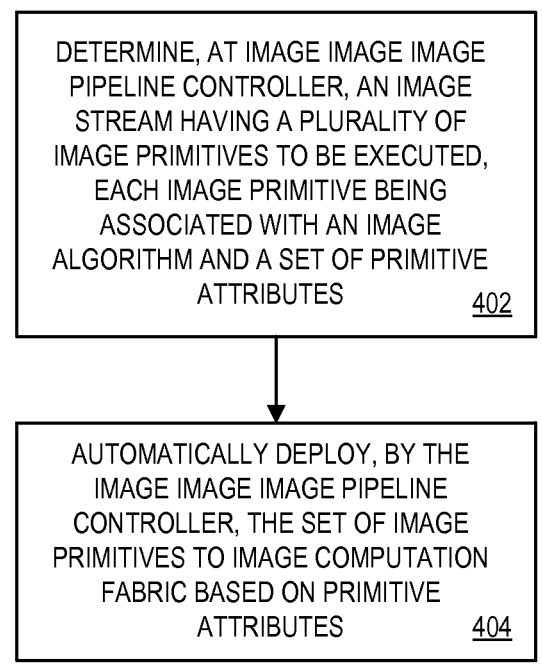
FIG. 4 is a flow diagram illustrating a method in accordance with some embodiments.

The image pipeline controller 330 may deploy image primitives 320 (e.g. to various components of the image computation fabric 310) in a number of different ways. For example, FIG. 4 is a flow diagram of a process that might be associated with the pipeline controller 330 of FIG. 3 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At 402, an image pipeline controller may determine an image stream having a plurality of image primitives to be executed, each image primitive being associated with an image algorithm and a set of primitive attributes. The image stream might be, for example, received from a video camera. At 404, the image pipeline controller may automatically deploy the set of image primitives to an image computation fabric based at least in part on primitive attributes.

As used herein, a primitive "attribute" may be any information that describes aspects of the operation or execution of the image primitive. One skilled in the art will recognize that a wide range of attributes may be assigned to each primitive or group of primitives within a segment, thus the attributes listed herein serve to illustrate the concepts of this invention and therefore do not limit the applicability of this invention to incorporate other useful attributes beside those listed.

Figure 5:
FIG. 5 illustrates primitive attributes for a convolution image primitive according to some embodiments.

For example, FIG. 5 illustrates primitive attributes 500 for a convolution image primitive according to some embodiments. The image attributes 500 may be, for example, defined by a developer of the image primitive. According to some embodiments, the primitive attributes 500 might reflect a number of computation units, a performance value, a power value, a thermal value, and/or a rank preference for the image attribute. By way of example, each image primitive might be assigned attributes a-priori by design engineers who characterize the primitive in connection with various criteria to define the image primitive in terms of: a performance rank for software primitives on various processors or fixed function hardware, a preferred processor(s) for software primitives, a ranking of performance versus power, a fixed function hardware availability (e.g., some primitives may be implemented only in software), and/or an indication of whether or not the image primitive can process a subset of image information (e.g., to be processed as 4 k cache-resident pixel image "tiles" for two dimensional images). That is, these primitive attributes 500 may be used to define image primitive behavior at run-time.

Figure 6:
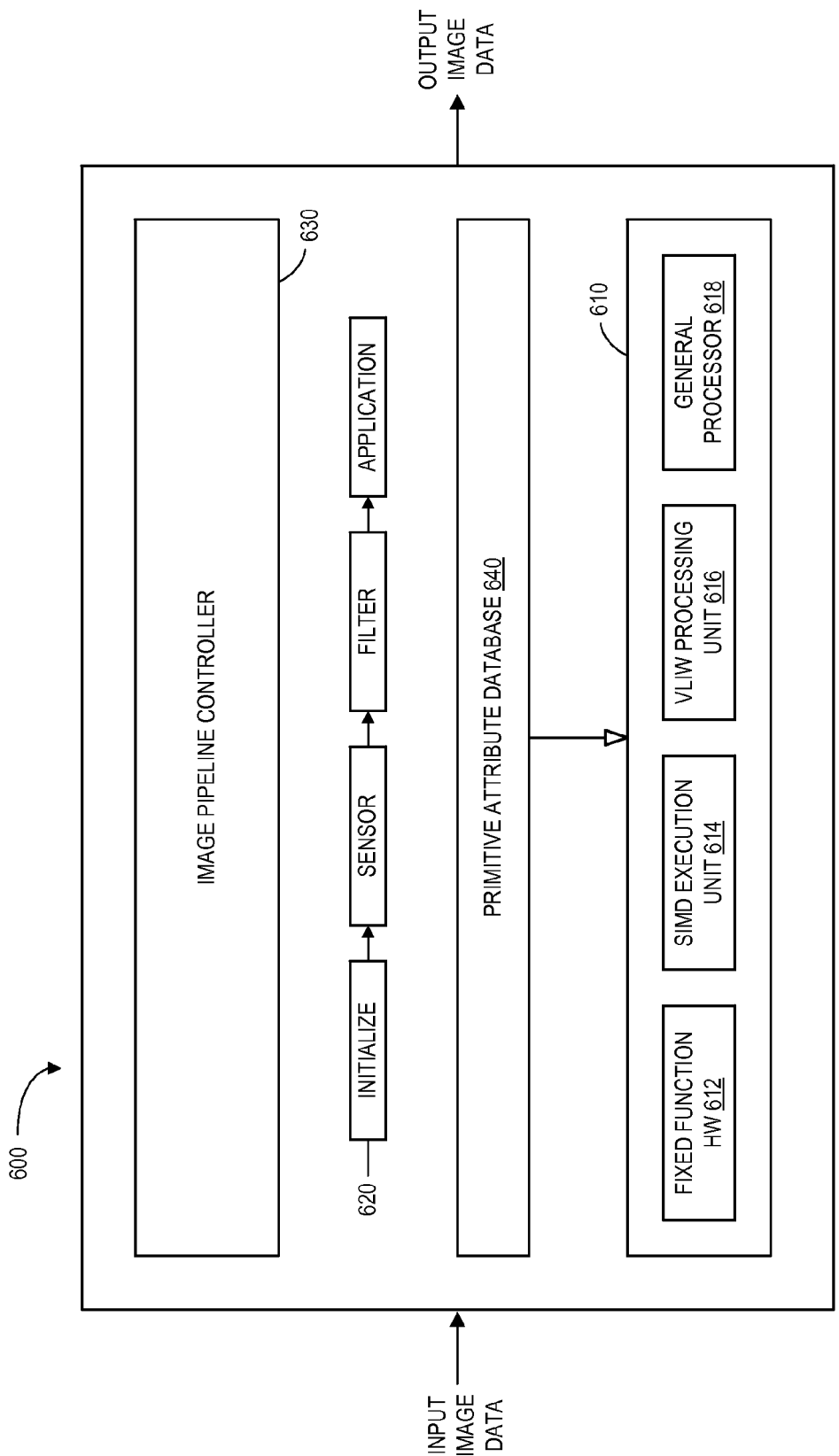
FIG. 6 is a block diagram of an imaging processing unit having a primitive attribute database or other data structure in accordance with some embodiments.

The image primitives may be stored within a primitive attribute database or other data structure and used by a compiler or translator that is accessed by a pipeline controller to interpret the attributes and execute primitives in accordance with the attributes. For example, FIG. 6 is a block diagram of an imaging processing unit 600 having a primitive attribute database 640 or other data structure in accordance with some embodiments. The image processing unit 600 includes an image computation fabric 610 to execute image information including a fixed function hardware image processing unit 612, an SIMD image execution unit 614, a VLIW processing unit 616, and/or a general processing unit 618. The image processing unit 600 may execute a series of image primitives 620 to create output image data based on input image data, and an image pipeline controller 630 may be used to help deploy the image primitives 620 to the image computation fabric 610. The image pipeline controller 630 may deploy image primitives 620 (e.g. to various components of the image computation fabric 610) based on information in the primitive attribute database 640 or other data structure. For example, a software application may use an Application Programming Interface (API) to query image primitive attributes and associated assets, and then the application may choose a preferred method for using the image primitive 620 based on the available primitive attributes.

According to some embodiments, the image pipeline controller 630 and/or primitive attribute database 640 or other data structure at run-time may read the primitive attributes of each image primitive 620 to determine the best way to run a workload within a given image computation fabric 610. For example, an image primitive 620 may be available both in fixed function hardware 612 and a software proxy as defined in the primitive attributes, in which case an application might choose which type should be executed to achieve a performance versus wattage target.

According to some embodiments, when a software application has not specified how to use an image primitive 620 via a primitive attribute, the image pipeline controller 630 and/or primitive attribute database 640 or other data structure may be used by the various components comprising the run-time framework within this invention to automatically attempt to optimize performance. According to some embodiments, the run-time framework may automatically attempt to optimize performance of primitives across a compute fabric according to a-priori defined attributes of each primitive, where primitives may be grouped into segments which may be executed in-order or out-of-order according to their attributes. Moreover, as described with respect to FIGS. 10A through 10C segments may chained together to form a pipeline, and the run-time framework may optimize the workload according to the available compute resources as per the attributes defined for each primitive. Moreover, the optimization may include adjusting the behavior of the computing assets such as a clock frequency, voltage, bus speed, processor speed, processor time slice size for threads, device and thread priorities, bus arbitration priorities, memory tile sizes, cache behavior, memory behavior, primitive implementation method of SW or FF HW, etc.

Figure 7:
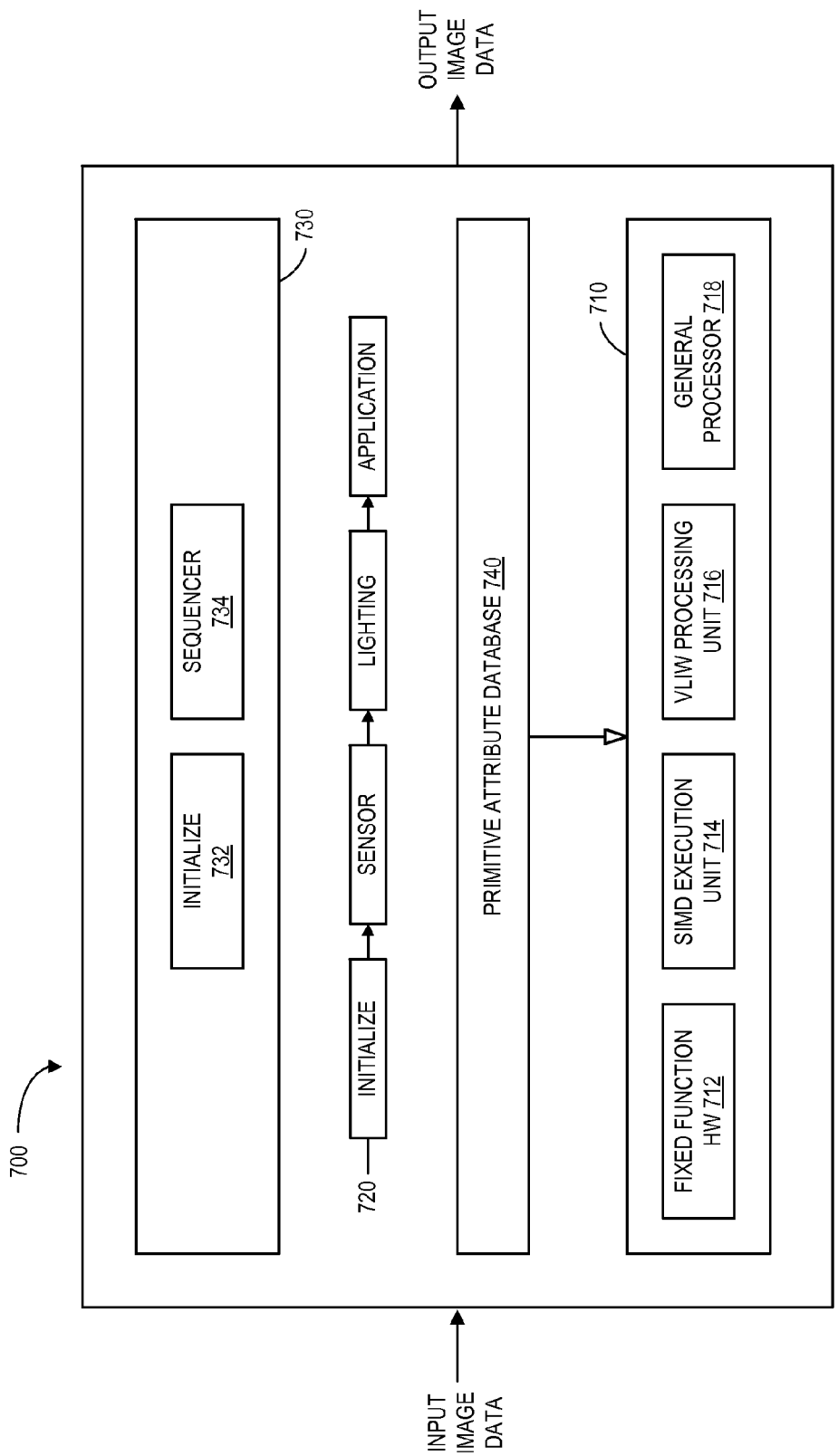
FIG. 7 is a block diagram of an imaging processing unit with an initialize component and a sequencer component in accordance with some embodiments.

For example, FIG. 7 is a block diagram of an imaging processing unit 700 with an initialize component 732 and a sequencer component 734 in accordance with some embodiments. The image processing unit 700 includes an image computation fabric 710 to execute image information including a fixed function hardware image processing unit 712, an SIMD image execution unit 714, a VLIW processing unit 716, and/or a general processing unit 718. The image processing unit 700 may execute a series of image primitives 720 to create output image data based on input image data, and an image pipeline controller 730 may be used to help deploy the image primitives 720 to the image computation fabric 710. The image pipeline controller 730 may deploy image primitives 720 (e.g. to various components of the image computation fabric 710) based on information in the primitive attribute database 740 or other data structure. The initialize component 732 may be used, for example, to initialize a camera, image sensor, or any other device.

The sequencer component 734 may execute a sequencing algorithm to order the image primitives 720 within the image stream for an in-order image primitive execution in a pipeline sequence. According to some embodiments, the image primitives 720 may be associated with an original order, and the execution of the image primitives 720 may be performed for at least some of the image primitives 720 in an order different than the original order for an "out-of-order" primitive execution in a pipeline sequence. For example, at run time the sequencer component 734 may order the image primitives 720 to execute efficiently within the image computation fabric 710. For example, portions of an image stream may allow out-of-order image primitive execution (and may have no dependencies) and such image primitives 720 may be candidates for parallel execution across the components of the image computation fabric 710.

Figure 8:
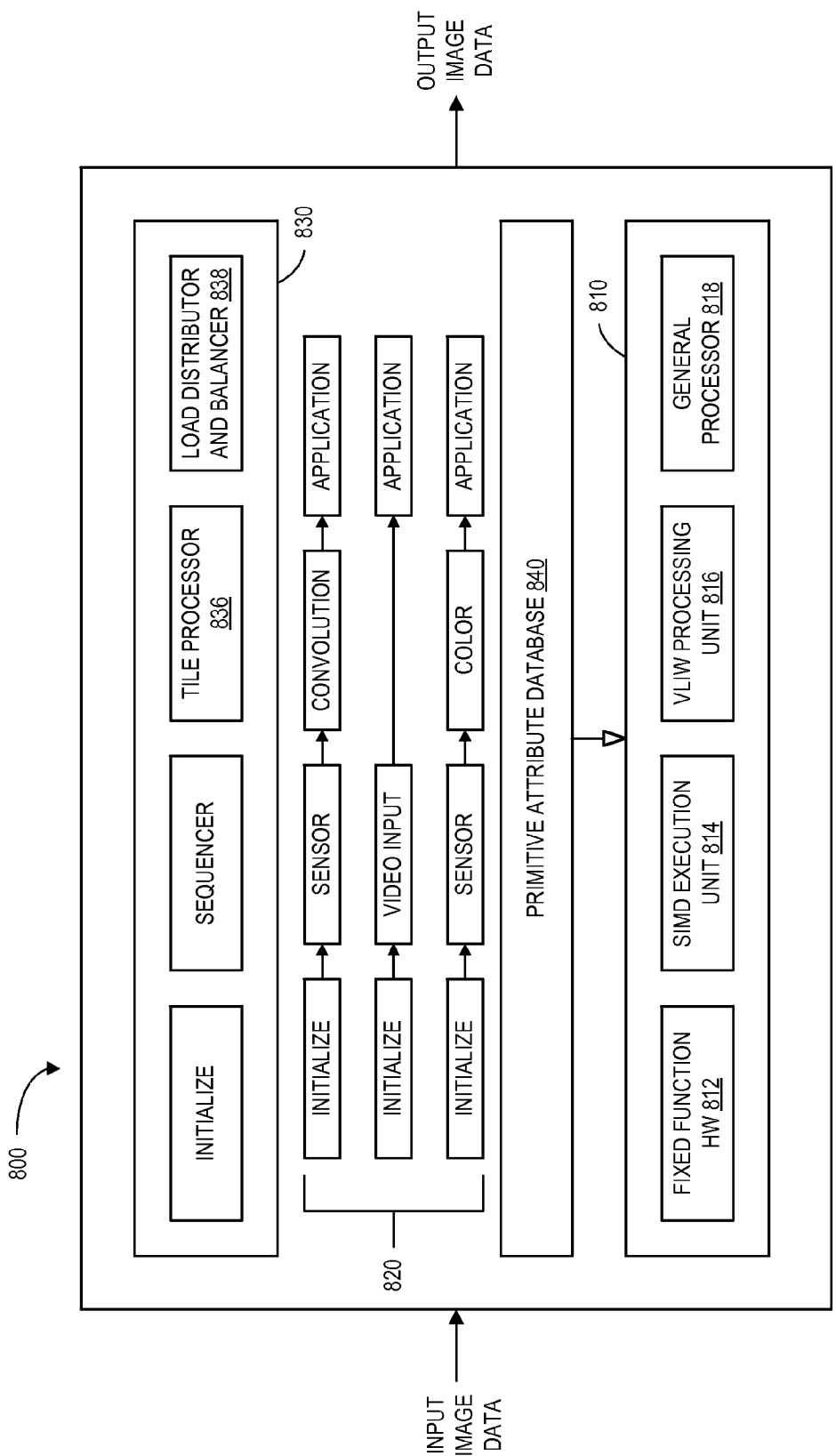
FIG. 8 is a block diagram of an imaging processing unit to process multiple image streams in accordance with some embodiments.

A resource manager and run time resource lock mechanism may be responsible for determining the availability of assets or components of the image computation fabric 710, locking assets for exclusive use by a pipeline or application, monitoring asset states, and/or freeing assets for use by other pipelines or application. Such an approach may permit, for example, multiple simultaneous applications to use the components of the image computation fabric 710. For example, FIG. 8 is a block diagram of an imaging processing unit 800 to process multiple image streams 820 in accordance with some embodiments. The image processing unit 800 includes an image computation fabric 810 to execute image information including a fixed function hardware image processing unit 812, an SIMD image execution unit 814, a VLIW processing unit 816, and/or a general processing unit 818. The image processing unit 800 may execute a series of image primitives for multiple image streams 820 to create output image data based on input image data, and an image pipeline controller 830 may be used to help deploy the image primitives of the image streams 820 to the image computation fabric 810. The image pipeline controller 830 may deploy image primitives of the image stream 820 (e.g. to various components of the image computation fabric 810) based on information in a primitive attribute database 840 or other data structure. For example, different image streams 820 may be associated with different applications being executed by an operating system, and information about the image streams 820 may be associated with an API.

According to some embodiments, a tile processor 836 in the image pipeline controller 830 may determine whether a tile subset of image data is to be deployed to the image computation fabric 810 based at least in part on a primitive attribute in the primitive attribute database 840. For example, a primitive attribute might indicate that a convolution image primitive in an image stream 820 can be divided into tiles that can be separately processed by components of the image computation fabric 810 (e.g., to allow for more efficient execution). That is, at run time the tile processor 835 may manage dividing an image stream 820 being sent through the pipeline into tiled regions when possible and/or specified by an application. The tiling technique may let an image be processed in smaller tiles that fit inside a cache line, enabling swap-free access to the data with little or no page faults. This may speed up performance as compared to processing each image primitive over an entire image, sequentially.

According to some embodiments, a load distributor and balancer 838 in the image pipeline controller 830 may execute a load-balancing algorithm between image primitives in different image streams 820. For example, at run time the load distributor and balancer 838 may let multiple applications simultaneously use available assets in the image computation fabric 810, and a stream multiplexer may manage resource locks and resource contention issues. The load distributor and balancer 838 may also execute a workload distribution algorithm to select an image processing component to receive one of the image primitives in the image streams 820. The selection may be based on a power and performance policy, resource reservation priorities, pipeline priorities, and/or resource availability arbitration priorities. According to some embodiments, a workload distribution algorithm may reduces stall and/or optimize for power or performance associated with execution of the image primitives in the image computation fabric 810. Thus, the load distributor and balancer 838 may spread the workload across available resources in the image computation fabric 810, to parallelize workload execution when possible. According to some embodiments, information in the primitive attribute database 840 may provide guidance for the load distributor and balancer 838.

Figure 9:
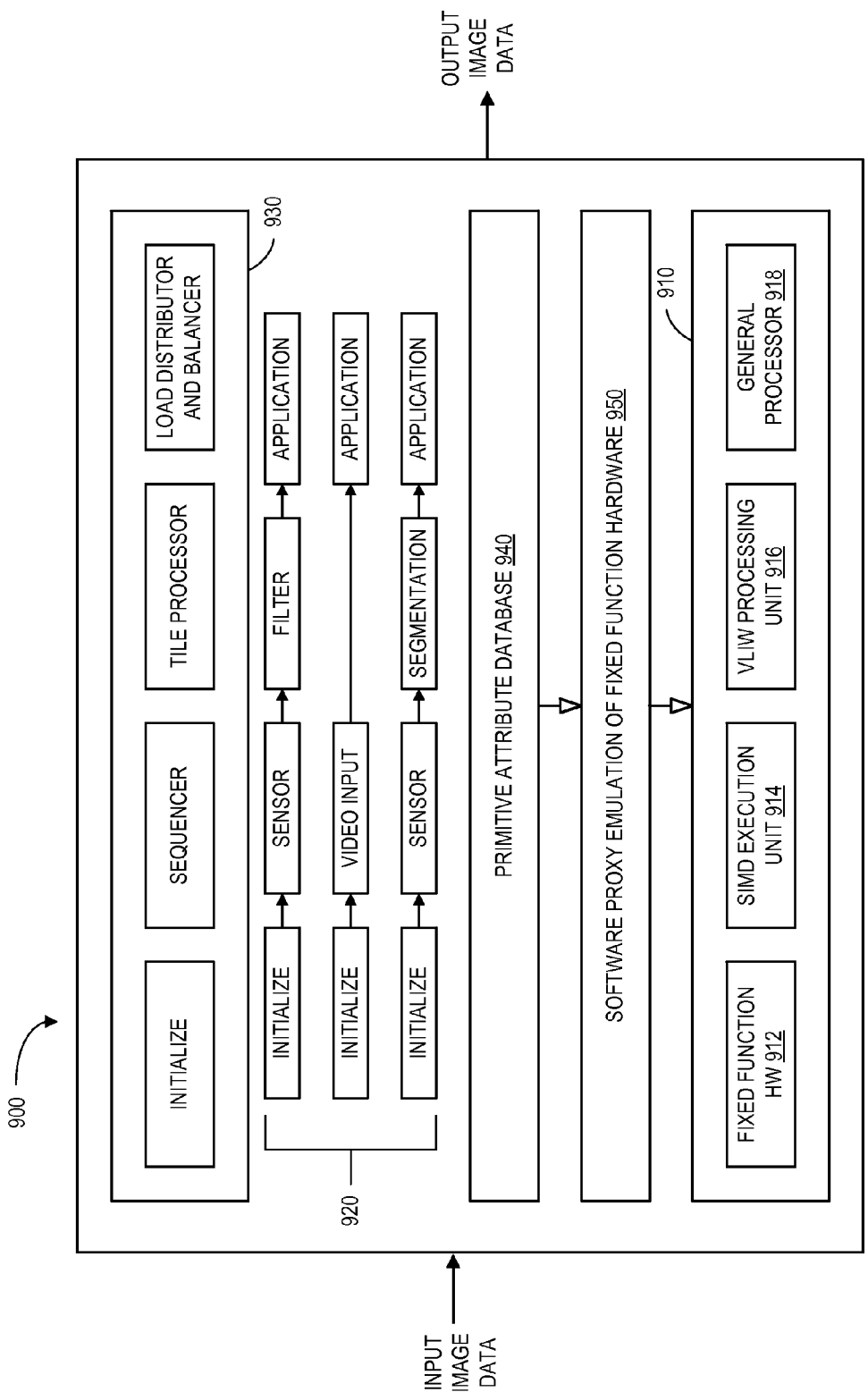
FIG. 9 is a block diagram of an imaging processing unit providing a software proxy emulation of fixed function hardware according to some embodiments.

For example, a workload distribution algorithm might select one of the fixed function hardware image processing unit 812 or a "software emulation" or proxy of the fixed function hardware image processing unit 812 based on primitive attributes and/or an image processing component status (e.g., when the fixed function hardware image processing unit 812 is in use by another application, the load distributor and balancer 838 might select to use a software proxy of that component instead). FIG. 9 is a block diagram of an imaging processing unit 900 providing a software proxy emulation of fixed function hardware 950 according to some embodiments. The image processing unit 900 includes an image computation fabric 910 to execute image information including a fixed function hardware image processing unit 912, an SIMD image execution unit 914, a VLIW processing unit 916, and/or a general processing unit 918. The image processing unit 900 may execute a series of image primitives for multiple image streams 920 to create output image data based on input image data, and an image pipeline controller 930 may deploy the image primitives of the image streams 920 to the image computation fabric 910. The image pipeline controller 930 may deploy image primitives of the image stream 920 to various components of the image computation fabric 910 and/or the software proxy emulations 950 based on information in a primitive attribute database 940 or other data structure. For example, an image primitive might be deployed to a software proxy emulation 950 when a corresponding component in the image computation fabric 910 is currently being used by another image stream 920 and/or another application.

Note that FIG. 9 represents a logical architecture according to some embodiments, and actual implementations may include more or different components arranged in other manners. Moreover, each system described herein may be implemented by any number of devices in communication via any number of communication paths. Two or more of the devices may be may be implemented in a single component. Further, each device may comprise any number of hardware and/or software elements suitable to provide the functions described herein as well as any other functions. Other topologies may be used in conjunction with other embodiments.

Figure 10A:
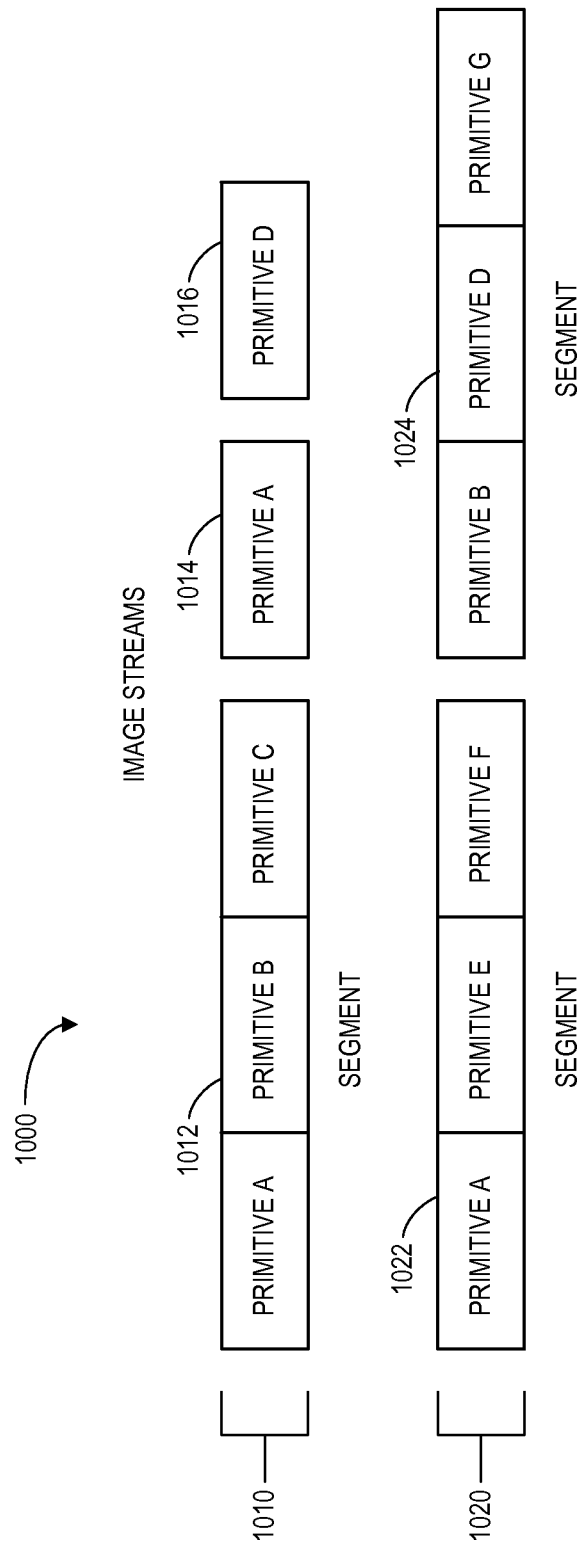
FIGS. 10A through 10C illustrate segments in image streams according to some embodiments.

The image streams 920 are composed of sequences of image primitives. According to some embodiments, a subset of the image primitives within a stream are associated with an image stream "segment." For example, FIG. 10A illustrates 1000 segments in image streams according to some embodiments. In particular, a first image stream 1010 includes an image stream segment 1012 comprising image primitives A, B, and C. The first image stream 1010 also includes a number of individual image primitives 1014, 1016. A second image stream 1020 includes other image stream segments 1022 (comprising image primitives A, E, and F) and 1024 (comprising image primitives B, D, and G).

Figure 10B:
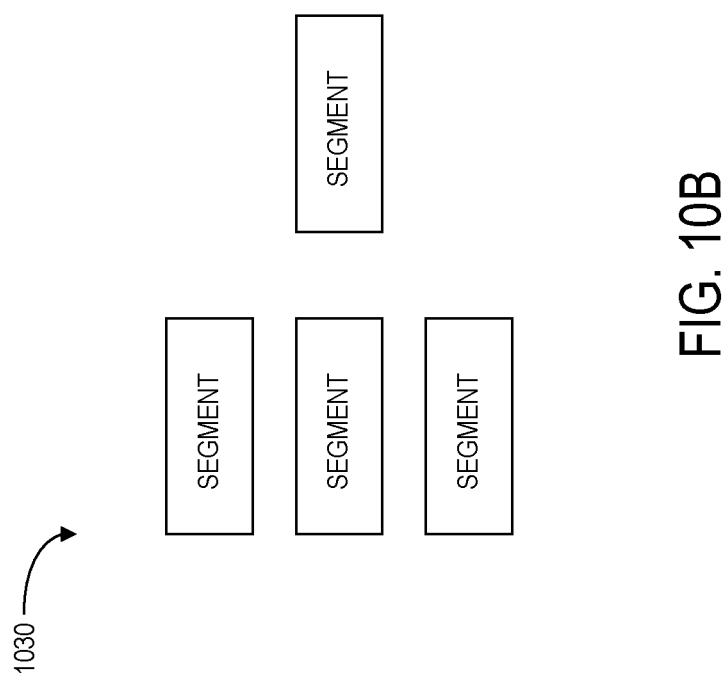
Figure 10C:
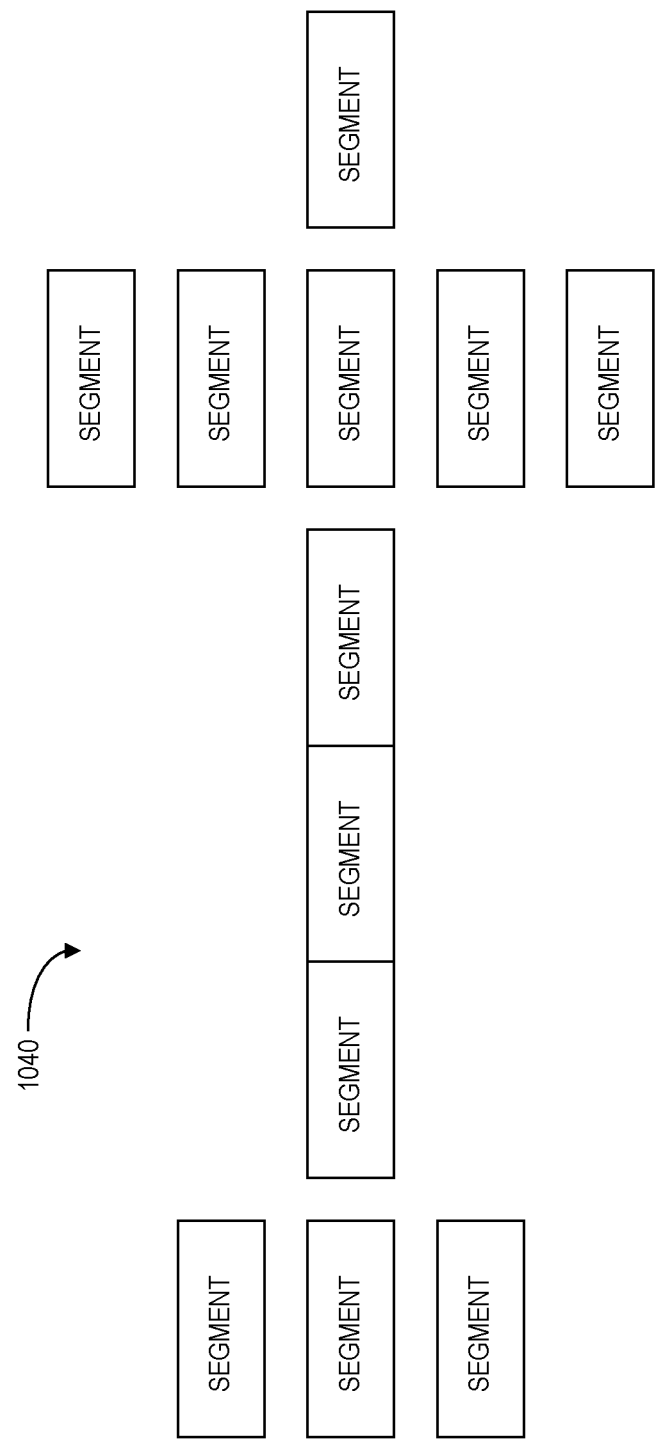

The image streams 1010, 1020 of FIG. 10A might be composed of "in-order" image stream segments. That is, each image stream segment might be deployed to the image computation fabric only after the prior segment has executed (sequential execution). Note, however, that some image streams might support out-of-order execution. For example, FIG. 10B illustrates 1030 three image stream segments being executed in parallel by the image computation fabric (spread out across computing resources). Similarly, FIG. 10C illustrates 1040 an image pipeline composed of both in-order and out-of-order image stream segments chained together.

According to some embodiments, the image stream segments may be associated with one or more image stream attributes for workload distribution, stall reduction, power optimization, performance optimization, load balancing, and/or a sequencing algorithm. Thus, a pipeline or image stream may be composed of segments, where segments are composed of sets of image primitives. Moreover, sets of primitives may be combinations of either fixed function hardware, software proxy emulations of the fixed function hardware that can be used when the fixed function hardware is busy, or "software only" primitives. Moreover, segments might be executed either in-order or out-of-order. According to some embodiments, image primitives, segments and/or entire pipelines may have policy attributes such as priority, power/performance budget, memory size requests, memory bandwidth requests. Note that a programmable segment could be provided such that it is associated with an arbitrary set of image primitives and/or an arbitrary image primitive order (e.g., to allow a customer to program an area image processing function).

Figure 11:
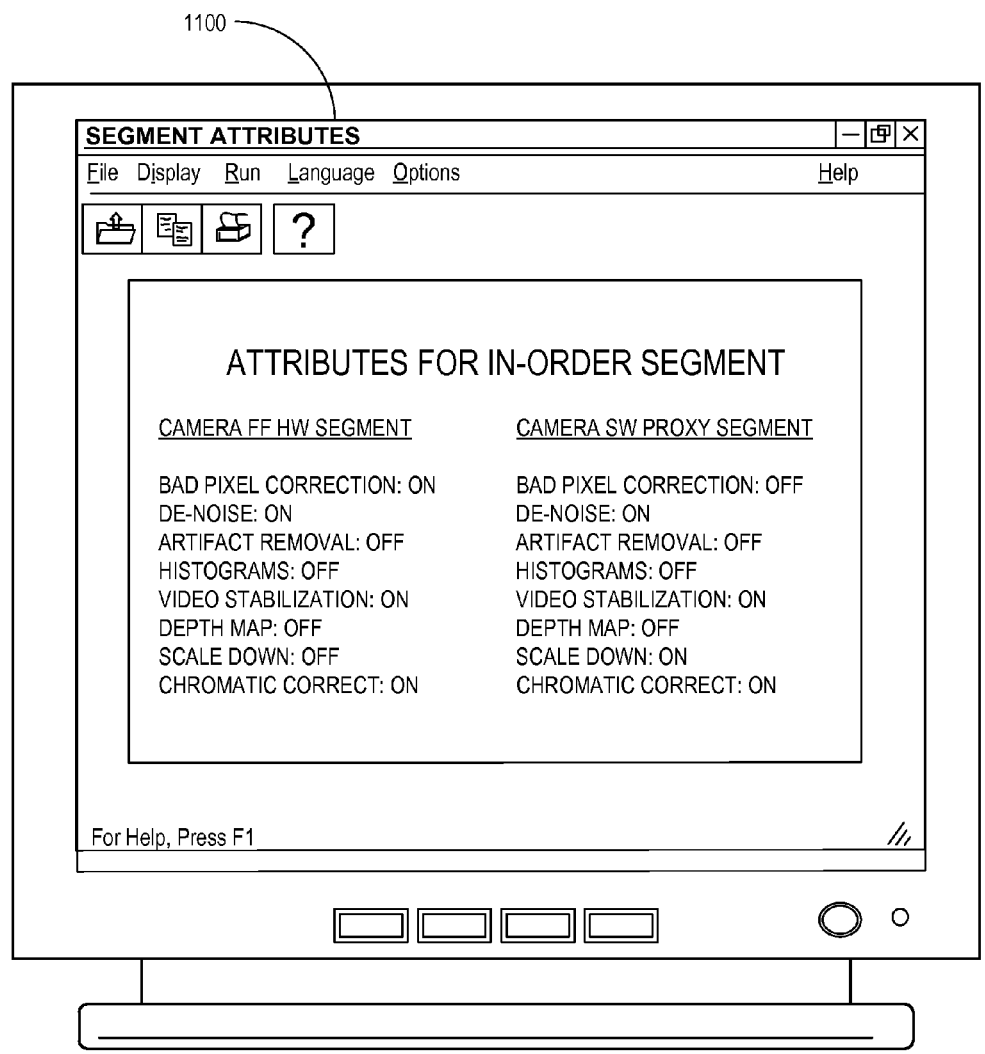
FIG. 11 is an example of a graphical user interface for segment attribute definition in accordance with some embodiments.

Thus, a segment of an image stream may be assigned various attributes to control its execution during run time. For example, FIG. 11 is an example of a Graphical User Interface 1100 for segment attribute definition in accordance with some embodiments. The GUI 1100 may, for example, let a software developer define attributes for a camera fixed function hardware segment and an associated camera software proxy segment. In particular, the GUI 1100 may be used to turn various attributes (e.g., de-noise, artifact removal, and/or video stabilization attributes) "or" or "off" for the segments as appropriate.

Figure 12:
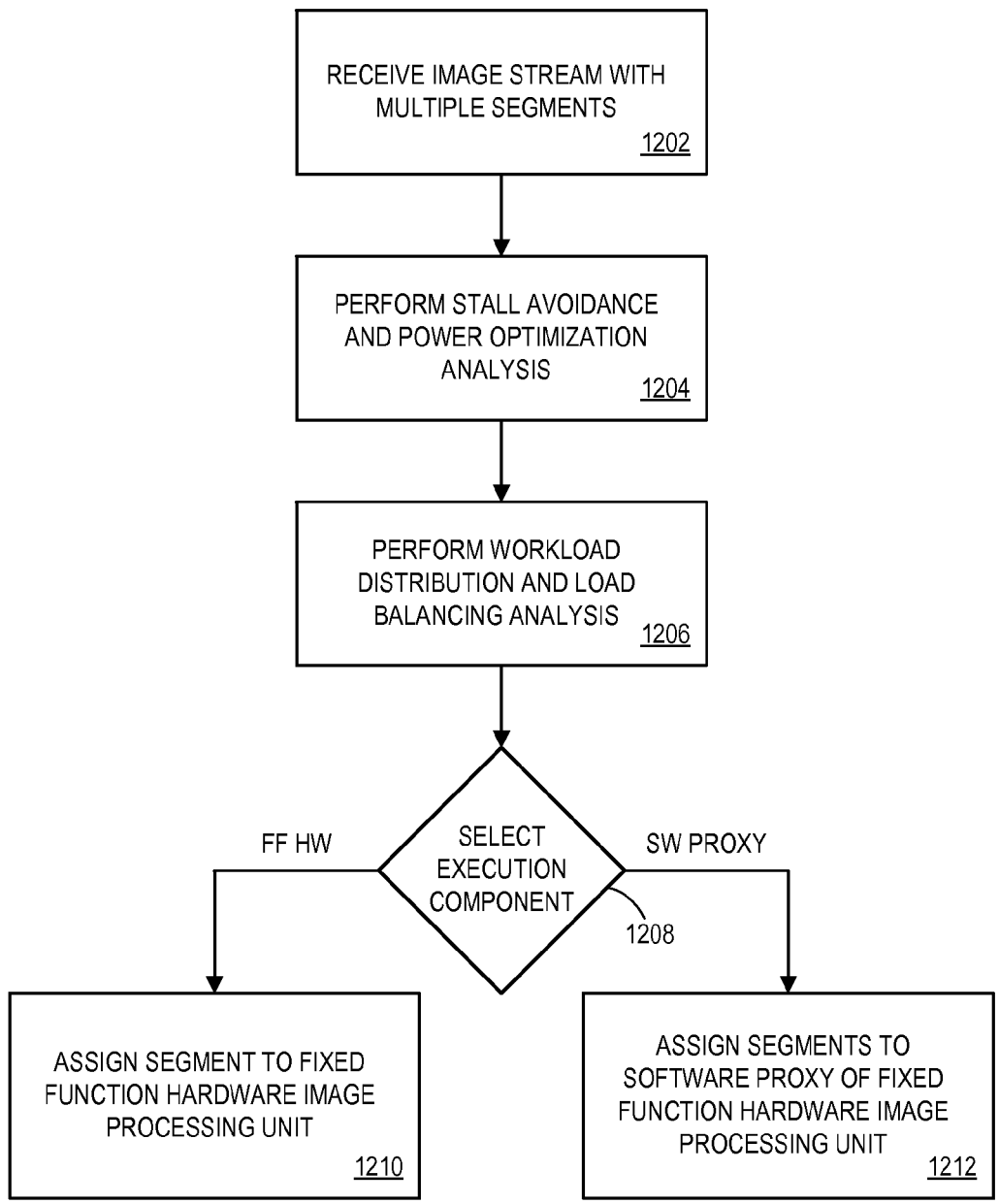
FIG. 12 is a flow diagram illustrating a method associated with image stream segments in accordance with some embodiments.

These attributes may be used by an image pipeline controller when deploying the segment to an image computation fabric. For example, FIG. 12 is a flow diagram illustrating a method associated with image stream segments in accordance with some embodiments. At 1202, an image stream with multiple segments may be received by an image pipeline controller. For example, the image stream might be received from a smartphone video camera. At 1204, a stall avoidance and power optimization analysis may be performed for the segment. For example, an image pipeline control might try to avoid deploying multiple tasks to the same component at the same time. At 1206, a workload distribution and load balancing analysis may be performed in connection with various pipelines, segments and/or individual image primitives. For example, an image pipeline controller might attempt to deploy tasks to under utilized image resources or assets. At 1208, an execution component may be selected for the segment. Based on the selection at 1208, the segment may be assigned to a fixed function hardware image processing unit at 1210 or a software proxy of a fixed function hardware image processing unit at 1212.

Figure 13:
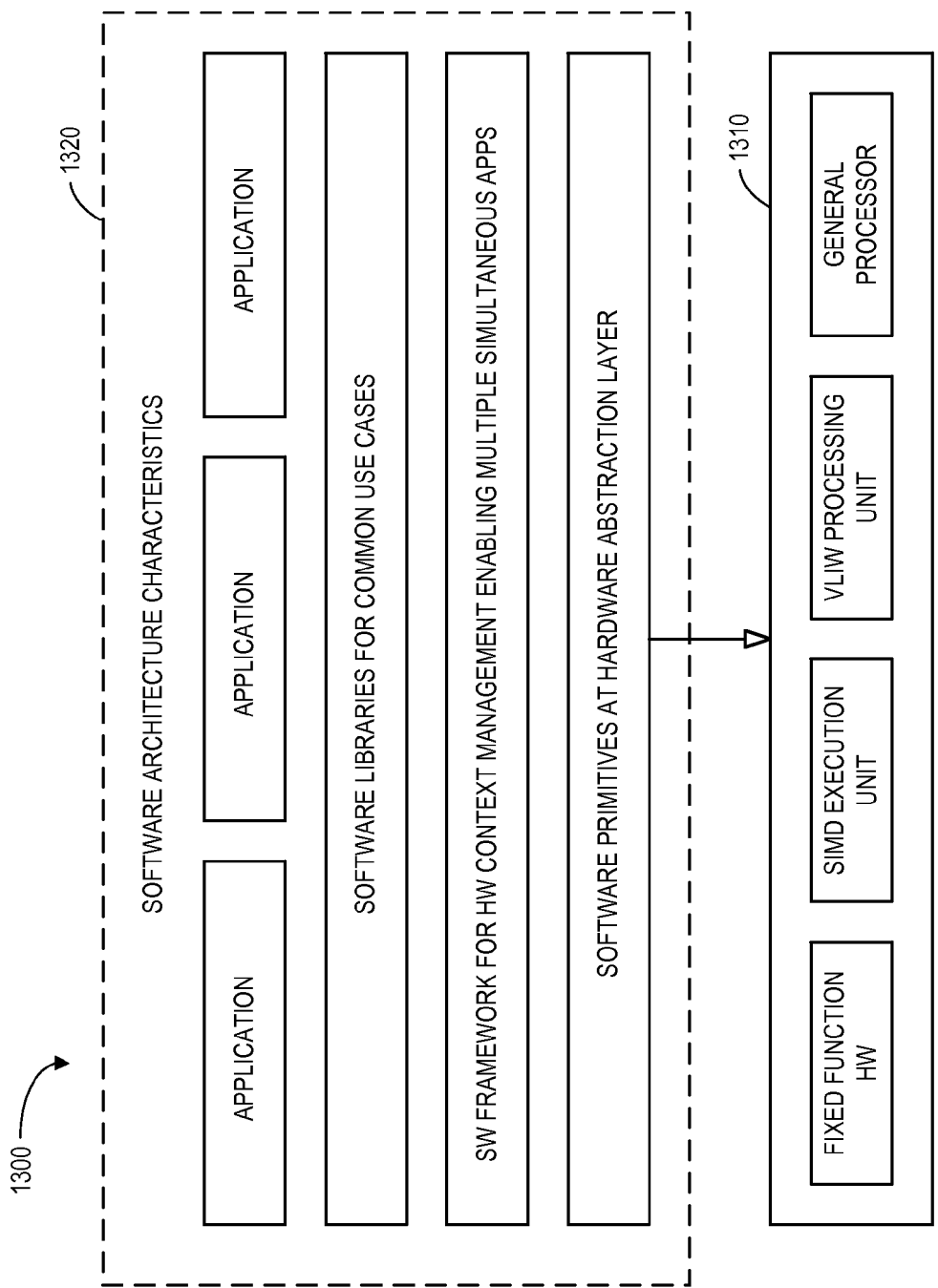
FIG. 13 is an overall view including an image computation fabric and software architecture characteristics according to some embodiments.

FIG. 13 is an overall view 1300 including an image computation fabric 1310 (e.g., associated with any of the image execution components described herein) and software architecture characteristics 1320 according to some embodiments. The software architecture characteristics 1320 may include a number of applications executing simultaneously. Moreover, the applications may access a software framework for hardware context management (enabling the multiple simultaneous applications) via software libraries that may be provided for common use cases. Moreover, software primitives at a hardware abstraction layer may be provided for the software architecture characteristics 1320. In this way, a programming model may be provided using image primitives to simplify development of software applications. Moreover, sensor processing may be associated with decreased software development and/or tool costs and improved software scalability for System On Chip (SOC) image products.

Embodiments described herein may provide a standard software API across different execution components and/visual computing assets associated with perceptual computing software and fixed function hardware, camera pipelines and asset to help provide an improved user experience and performance versus wattage advantages.

Accordingly, a method and mechanism to efficiently, accurately, and automatically deploy image primitives to an image computation fabric may enable use cases such as three dimensional depth perception, high resolution images, high frame rate image capture for computational photography, face recognition, scene analysis, etc. An image pipeline may include fixed function hardware assets close to the image sensor, fixed function hardware assets inside processor graphics components, and various software API's and libraries to handle high level use cases. A cohesive architectural model may tie together disparate assets into a complete system to enable software innovation and to expose a camera pipeline and the available assets across operating system platforms.

According to some embodiments, a run-time framework may automatically attempt to facilitate or optimize performance of primitives across a compute fabric according to a-priori defined attributes of each primitive. Moreover, according to some embodiments, primitives may be grouped into segments which might be executed in-order or out-of-order according to their attributes. Moreover, segments may be chained together into a pipeline, and the run-time framework may attempt to facilitate or optimize the workload according to the available compute resources as per the attributes defined for each primitive or segment. According to some embodiments, the facilitation or optimization might include support for multiple simultaneous applications to share the compute fabric, interleaving for resource sharing and usage by different applications, resource locking and sharing mechanisms for primitives in a compute fabric, adjusting the behavior of the computing primitive assets such as by adjusting a clock frequency, voltage, bus speed, processor speed, processor time slice size for threads, device and thread priorities, bus arbitration priorities, memory tile sizes, cache behavior, memory behavior, primitive implementation method of SW or FF HW, etc.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to particular types of image sensors and displays, note that embodiments may be associated with other types of sensors and displays. For example, three dimensional cameras and/or displays may be supported by any of the embodiments described herein. Moreover, while embodiments have been illustrated using particular ways of processing image information, note that embodiments might instead be associated with any other sorts of image primitives and/or algorithms.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method, comprising: determining, at an image pipeline controller, an image stream comprising a plurality of image primitives associated with different types of image algorithms to be executed for processing image data, each image primitive used by an imaging application that provides processing to create output image data wherein the plurality of image primitives are associated with an image primitive library including at least one of: (i) a sensor primitive; (ii) a calibration primitive, (iii) an optics primitive, (iv) a lighting primitive, (v) a segmentation primitive or (vi) a filter primitive; and automatically deploying, by the image pipeline controller, the plurality of image primitives to an image computation fabric based at least in part on primitive attributes that describe aspects of an operation of the plurality of image primitives.

2. The method of claim 1, wherein the image computation fabric comprises a plurality of image processing components, including at least one of: (i) a fixed function hardware image processing unit, (ii) a single instruction, multiple data image execution unit, (iii) a very long instruction word processing unit, or (iv) a general processing unit.

3. The method of claim 2, further comprising:
executing a workload distribution algorithm to select an image processing component to receive one of the image primitives in the image stream.

4. The method of claim 3, wherein the workload distribution algorithm selects one of a fixed function hardware image processing unit or a software emulation of the fixed function hardware image processing unit based on primitive attributes and an image processing component status.

5. The method of claim 4, wherein said selection is further based on at least one of: (i) a power and performance policy, (ii) resource reservation priorities, (iii) pipeline priorities, or (iv) resource availability arbitration priorities.

6. The method of claim 3, wherein the workload distribution algorithm reduces stalls and optimizes for power or performance associated with execution of the image primitives in the image computation fabric.

7. The method of claim 1, wherein the image pipeline controller is associated with at least one of: (i) a hardware image pipeline controller, (ii) a software image pipeline controller, or (iii) a combination of hardware and software image pipeline controller components.

8. The method of claim 1, wherein image primitives associated with a plurality of image streams are deployed.

9. The method of claim 8, wherein different image streams are associated with different applications being executed by an operating system, and information about the image streams are associated with an application programming interface.

10. The method of claim 8, further comprising:
executing a load-balancing algorithm between image primitives in different image streams.

11. The method of claim 1, further comprising:
executing a sequencing algorithm to order the image primitives within the image stream for an in-order image primitive execution in a pipeline sequence.

12. The method of claim 11, wherein the image primitives are associated with an original order and said executing is performed for at least some of the image primitives in an order different than the original order for an out-of-order image primitive execution in a pipeline sequence.

13. The method of claim 1, wherein a subset of the image primitives are associated with an image stream segment.

14. The method of claim 13, wherein an image stream segment is associated with at least one image stream attribute for: (i) workload distribution, (ii) stall reduction, (iii) power optimization, (iv) performance optimization, (v) load balancing, or (vi) a sequencing algorithm.

15. The method of claim 1, wherein the image stream is associated with a set of image data, and further comprising:
determining whether a tile subset of the image data is to be deployed to the image computation fabric based at least in part on a primitive attribute.

16. The method of claim 1, wherein the image attributes are defined by a developer and stored within a primitive attribute database.

17. The method of claim 16, wherein at least one primitive attribute is associated with at least one of: (i) a number of computation units, (ii) a performance value, (iii) a power value, (iv) a thermal value, or (v) a rank preference.

18. The method of claim 1, wherein the image stream is associated with at least one of: (i) a camera sensor, (ii) a video sensor, (iii) a display screen, (iv) a depth sensor or stereo image pair, or (v) a three dimensional image.

19. The method of claim 1, wherein at least one image algorithm is associated with at least one of: (i) pixel correction, (ii) artifact removal, (iii) histogram information, (iv) a scaling function, (v) face recognition, (vi) visual object recognition, (vii) visual scene analysis, (viii) machine vision, (ix) gesture recognition, or (x) depth map calculation.

20. A non-transitory computer-readable storage medium having stored thereon instructions that when executed by a machine result in the following:
determining, at an image pipeline controller, an image stream comprising a plurality of image primitives associated with different types of image algorithms to be executed, each image primitive used by an imaging application that provides processing to create output image data wherein the plurality of image primitives are associated with an image primitive library including at least one of: (i) a sensor primitive; (ii) a calibration primitive, (iii) an optics primitive, (iv) a lighting primitive, (v) a segmentation primitive or (vi) a filter primitive; and
automatically deploying, by the image pipeline controller, the plurality of image primitives to an image computation fabric based at least in part on primitive attributes that describe aspects of an operation of the plurality of image primitives.

21. The medium of claim 20, wherein the image computation fabric comprises a plurality of image processing components, including at least one of: (i) a fixed function hardware image processing unit, (ii) a single instruction, multiple data image execution unit, (iii) a very long instruction word processing unit, or (iv) a general processing unit.

22. The medium of claim 21, further comprising: executing a workload distribution algorithm to select an image processing component to receive one of the image primitives in the image stream.

23. An apparatus, comprising:
an image computation fabric including a plurality of image processing components; and an image pipeline controller comprising a processor to: (a) determine an image stream comprising a plurality of image primitives associated with different types of image algorithms to be executed, each image primitive used by an imaging application that provides processing to create output image data wherein the plurality of image primitives are associated with an image primitive library including at least one of: (i) a sensor primitive; (ii) a calibration primitive, (iii) an optics primitive, (iv) a lighting primitive, (v) a segmentation primitive or (vi) a filter primitive, and (b) deploy the plurality of image primitives to the image computation fabric based at least in part on primitive attributes that describe aspects of an operation of the plurality of image primitives.

24. The apparatus of claim 23, wherein subsets of the image primitives are associated with image stream segments, each image stream segment being associated with at least one image stream attribute and further wherein the image stream segments are associated with an original order and are executed in an order other than the original order.

25. The apparatus of claim 24, wherein the image pipeline controller facilitates image primitive execution by adjusting at least one of: (i) a clock frequency, (ii) voltage, (iii) bus speed, (iv) processor speed, (v) processor time slice size for threads, (vi) device and thread priorities, (vii) bus arbitration priorities, (viii) memory tile sizes, (ix) cache behavior, (x) memory behavior, or (xi) selection of fixed function hardware or software emulation.

26. A system, comprising:
a digital display port;
an image computation fabric including a plurality of image processing components; and
an image pipeline controller comprising a processor to: (a) determine an image stream comprising a plurality of image primitives associated with different types of image algorithms to be executed, each image primitive used by an imaging application that provides processing to create output image data wherein the plurality of image primitives are associated with an image primitive library including at least one of: (i) a sensor primitive; (ii) a calibration primitive, (iii) an optics primitive, (iv) a lighting primitive, (v) a segmentation primitive or (vi) a filter primitive, and (b) deploy the plurality of image primitives to the image computation fabric based at least in part on primitive attributes that describe aspects of an operation of the plurality of image primitives.

27. The system of claim 26, wherein subsets of the image primitives are associated with image stream segments, each image stream segment being associated with at least one image stream attribute and further wherein the image stream segments are associated with an original order and are executed in an order other than the original order.

28. The system of claim 26, wherein the image pipeline controller facilitates image primitive execution by adjusting at least one of: (i) a clock frequency, (ii) voltage, (iii) bus speed, (iv) processor speed, (v) processor time slice size for threads, (vi) device and thread priorities, (vii) bus arbitration priorities, (viii) memory tile sizes, (ix) cache behavior, (x) memory behavior, or (xi) selection of fixed function hardware or software emulation.

\* \* \* \* \*